(12) United States Patent
Levy-Rosenthal

(10) Patent No.: US 12,260,011 B2
(45) Date of Patent: Mar. 25, 2025

(54) MACHINE LEARNING SYSTEMS AND METHODS FOR SENSORY AUGMENTATION USING GAZE TRACKING AND EMOTIONAL PREDICTION TECHNIQUES

(71) Applicant: MetaSoul Inc., New York, NY (US)

(72) Inventor: Patrick Levy-Rosenthal, New York, NY (US)

(73) Assignee: MetaSoul Inc., New York, NY (US)

( * ) Notice: Subject to any disclaimer, the term of this patent is extended or adjusted under 35 U.S.C. 154(b) by 0 days.

(21) Appl. No.: 17/974,872

(22) Filed: Oct. 27, 2022

(65) Prior Publication Data

US 2023/0134451 A1 May 4, 2023

Related U.S. Application Data

(60) Provisional application No. 63/273,022, filed on Oct. 28, 2021.

(51) Int. Cl.
*G06F 3/01* (2006.01)
(52) U.S. Cl.
CPC .................... *G06F 3/011* (2013.01)
(58) Field of Classification Search
CPC ........... G06F 3/011; G06F 40/30; G06F 3/013
See application file for complete search history.

(56) References Cited

U.S. PATENT DOCUMENTS

| 9,544,204 | B1* | 1/2017 | Madhivanan | ......... H04L 67/535 |
| 2015/0269133 | A1* | 9/2015 | Do | ........................... G06F 3/013 |
| | | | | 348/78 |
| 2020/0364539 | A1* | 11/2020 | Anisimov | ............... G06F 3/011 |

FOREIGN PATENT DOCUMENTS

WO WO-2020069979 A1 * 4/2020 ........... H05B 47/155

* cited by examiner

*Primary Examiner* — Samantha (Yuehan) Wang
(74) *Attorney, Agent, or Firm* — Nelson Mullins Riley & Scarborough LLP; Anthony A. Laurentano

(57) ABSTRACT

A method for reading sensory augmentation comprising displaying a text on a reading device, determining a reader's current location in the text with a gaze tracking system, identifying a subsequent location in the text, processing the text at the subsequent location with an emotion processing unit to predict an emotional response to the text at the subsequent location, generating a sensory augmentation routine based on the predicted emotional response, and initiating playback of the sensory augmentation routine at the subsequent location in the text. The sensory augmentation routine can include a musical composition, a sound, and/or an ambient lighting effect. The gaze tracking system can be configured to receive data from the reading device related to the text currently displayed thereon and to receive data from an image capture device related to eye movement tracking of the reader.

18 Claims, 5 Drawing Sheets

MACHINE LEARNING SYSTEMS AND METHODS FOR SENSORY AUGMENTATION USING GAZE TRACKING AND EMOTIONAL PREDICTION TECHNIQUES

RELATED APPLICATION

The present application claims priority to U.S. provisional patent application Ser. No. 63/273,022, titled Machine Learning Systems and Methods for Sensory Augmentation Using Gaze Tracking and Emotional Prediction Techniques, filed Oct. 28, 2021, the contents of which are herein incorporated by reference.

BACKGROUND OF THE INVENTION

The present disclosure relates generally to the fields of artificial intelligence and machine learning systems. More specifically, the present disclosure relates to machine learning systems and methods for generating sensory augmentation routines to accompany text using emotional prediction techniques and gaze tracking.

Many individuals enjoy playing music while reading a book, magazine, or other text. In many instances, the individual selects the music based on how they are feeling, based on an emotional response to a storyline, or based on the particular genre (e.g., thriller, romance action, historical non-fiction, scientific literature, etc.) of the text. However, within many texts, a story or situation can change rapidly and the music selected by the reader may not match the storyline or the reader's current emotional response thereto. Of course, the reader can change the ambient music as they progress through a given text, but this requires the individual to stop reading and select a new musical composition. However, when the individual stops reading, their flow is disrupted, which can have a deleterious effect on reading speed and comprehension when reading is resumed. Furthermore, while music selected by the individual may aid in general reading enjoyment, it may not aid in immersing the individual in the reading material as it is not directly linked to what is happening in the text.

Thus, what would be desirable is a system that automatically and efficiently generates music, sound, or other sensory augmentation routines based on a reader's emotional response or the specific context of a given storyline, or other text. Accordingly, the systems and methods disclosed herein solve these and other needs.

SUMMARY OF THE INVENTION

The present invention is directed to a method for reading sensory augmentation comprising displaying a text on a reading device, determining a reader's current location in the text with a gaze tracking system, identifying a subsequent location in the text, processing the text at the subsequent location with an emotion processing unit to predict an emotional response to the text at the subsequent location, generating a sensory augmentation routine based on the predicted emotional response, and initiating playback of the sensory augmentation routine at the subsequent location in the text. The sensory augmentation routine can include a musical composition, a sound, and/or an ambient lighting effect, or any combination thereof. The gaze tracking system can be configured to receive data from the reading device related to the text currently displayed thereon and to receive data from an image capture device related to eye movement tracking of the reader.

The method of the present invention an further include processing the text at the subsequent location to identify one or more contextual indicators, generating a second sensory augmentation routine based on the one or more contextual indicators, and initiating playback of the second sensory augmentation routine at the subsequent location in the text. The second sensory augmentation routine can include a musical composition, a sound, and/or an ambient lighting effect, or any combination thereof.

The method can also include one or more of determining if the reader is currently reading, stopping playback of the sensory augmentation routine if the reader is not currently reading, and determining a current reading speed of the reader if they are currently reading. The method can further include determining if the current reading speed of the reader is above a predetermined threshold; generating a second sensory augmentation routine of the current reading speed is below the predetermined threshold, and generating a third sensory augmentation routine of the current reading speed is above the predetermined threshold.

According to the present invention, the method can still further include reducing the predetermined threshold if the current reading speed is below the predetermined threshold, increasing the predetermined threshold if the current reading speed is above the predetermined threshold, and storing the reduced or increased predetermined threshold to a memory for subsequent retrieval.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to machine learning systems and methods for sensory augmentation using gaze tracking and emotional prediction techniques, as discussed in detail below in connection with FIGS. 1-5.

Figure 1:
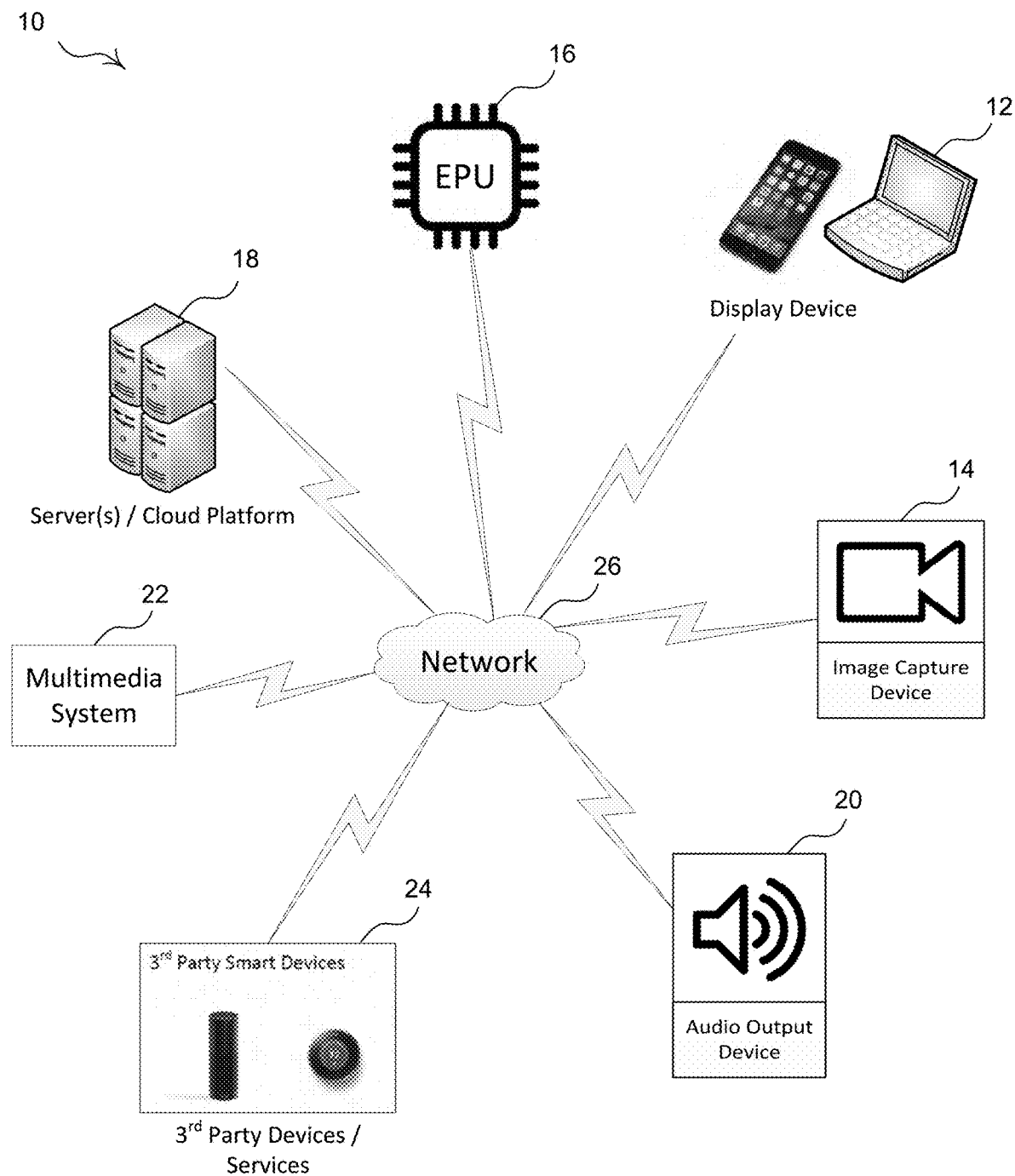
FIG. 1 is a diagram illustrating hardware and software components of the system of the present invention.

FIG. 1 is a diagram illustrating the system 10 of the present disclosure. Generally, the system 10 monitors a reader's progress through a given text using gaze tracking systems to generate one or more sensory augmentation routines using emotional prediction techniques to accompany the text as a reader progresses therethrough, elevating the reader's experience, enhancing reading comprehension, and increasing reading speed. As described in greater detail herein, sensory augmentation routines can include, for example, ambient music, contextual sounds, contextual lighting effects, and the like, which are selected to compliment a predicted emotional timbre of the text being read by a reader. As shown in FIG. 1, the system 10 includes a display device 12, an image capture device or vision system 14, and an emotion processing unit ("EPU") 16. The system 10 can also include, or be in communication with, other systems such as a remote server/"cloud"-based computing platform 18, an audio output device 20 (e.g., headphones, a stereo system, etc.), a multimedia system 22 (e.g., an A/V system or home theatre), and one or more $3^{rd}$ party smart devices and/or services 24 (e.g., voice-enabled speakers, smart lighting systems, connected home appliances, streaming music and video services, etc.), and combinations thereof.

The display device 12 can be a smartphone, a tablet computer, a laptop computer, a desktop computer, or any other device capable of displaying the text to the reader. It should be understood that the image capture device 14 can be any image or video capture device or vision system with sufficient resolution and/or processing power to capture movements of the reader's eyes such that gaze tracking can be performed. Additionally, the image capture device 14 need not be a standalone device or system and can be integrated with the display device 12, for example, but not limited to, a front-facing camera of a smartphone of tablet computer. As described in greater detail in connection with FIG. 2, the EPU can be a cloud-based service, a computer, a processor, an application specific integrated circuit ("ASIC") device, or a combination thereof, and is configured to receive information from one or more of the display device and the image capture device and generate the sensory augmentation routines using emotional prediction techniques. For example, the EPU can be an emotion processing unit described by U.S. Pat. No. 10,424,318, the entire disclosure of which is hereby expressly incorporated by reference. Importantly, the EPU (as disclosed in the '318 patent) generates its own emotional state (e.g., an emotional state of the EPU itself) based on inputs, which is used by the system 10 to predict a future emotional state of a person.

The devices of the system 10 can communicate with each other over a network 26, which could include, but is not limited to, the Internet. Of course, as known to one of ordinary skill in the art, the network 26 can provide for communication between the devices of the system 10 using one or more of wired (e.g., RS485, ethernet, USB, serial, etc.), wireless (e.g., Wi-Fi, Bluetooth, ZigBee, Z-Wave, cellular, thread, etc.), and direct communication protocols and combinations thereof. While the foregoing discussion references network 26, it shall be understood that the present system can be a self-contained system that does not include network connectivity or cloud communication capabilities. For example, in such a system, the display device 12 the image capture device 14, and the EPU 16 could be included in a single device, or could be directly connected to one or more of the remaining devices of the system 10 by way of a serial connection or any other suitable direct communication protocols.

Figure 2:
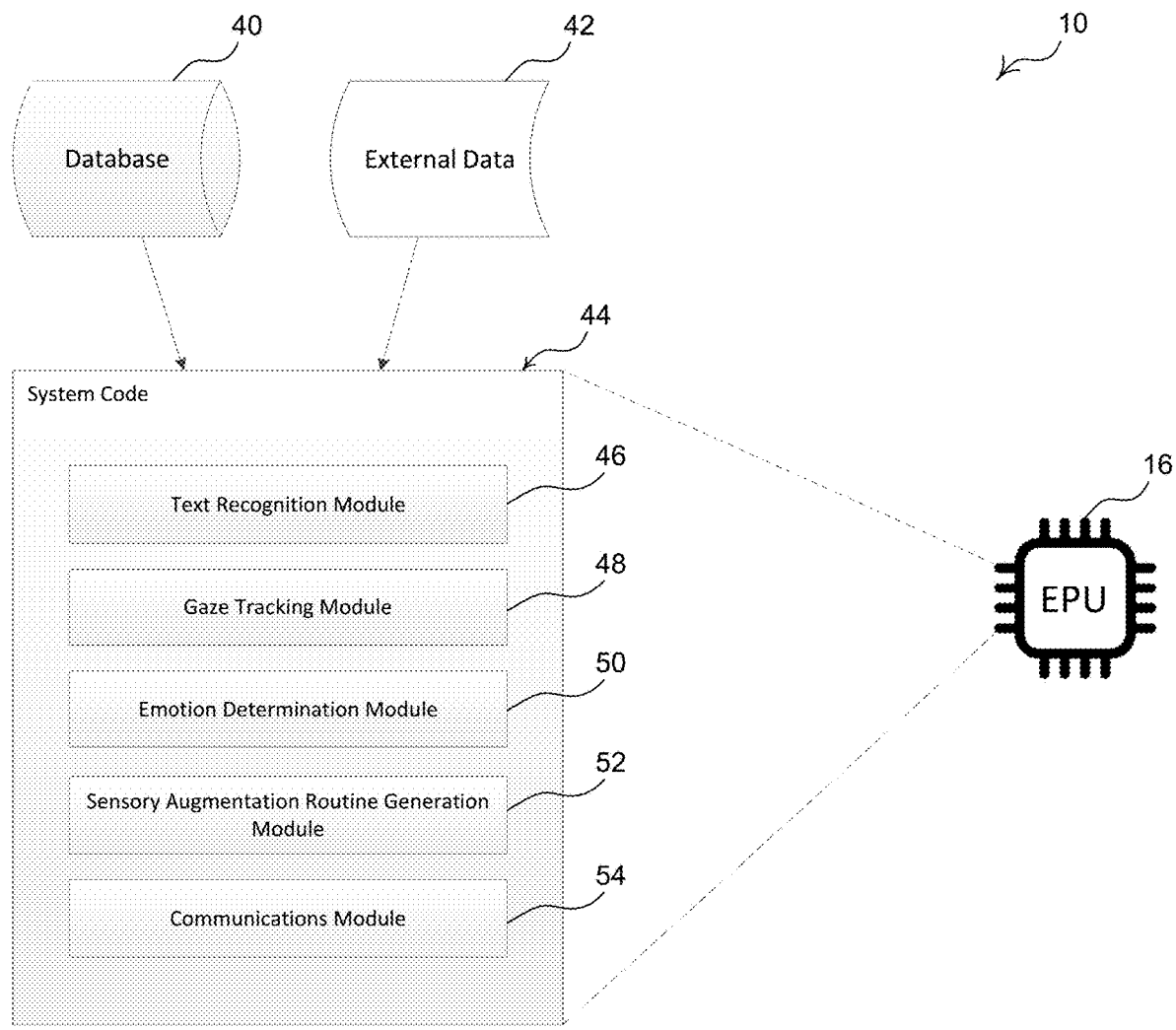
FIG. 2 is a diagram illustrating hardware and software components of an emotion processing unit of the system of the present invention.

FIG. 2 is a diagram illustrating additional hardware and software components capable of being utilized to implement the system 10 of the present disclosure. As shown, the EPU 16 could be in communication with one or more databases 40 (e.g., music databases, user information databases, etc.), which could be stored, for example, in server/cloud platform 18, and could receive external data 42 from one or more devices or systems, such as, but not limited to the display device 12 and the image capture device 14. The EPU 16 executes system code 44 to generate the one or more sensory augmentation routines to accompany text as a reader progresses therethrough using gaze tracking and emotional prediction algorithms. As discussed above, the EPU could include, but is not limited to, a personal computer, a laptop computer, a tablet computer, a smart telephone, a server, and/or a cloud-based computing platform.

The system code 44 (i.e., non-transitory, computer-readable instructions) can be stored on a computer-readable medium and is executable by the EPU, or in combination with one or more additional computer systems. The system code 44 could include various custom-written software modules that carry out the steps/processes discussed herein, and could include, but is not limited to, a text recognition module 46, a gaze tracking module 48, an emotion determination module 50, a sensory augmentation routing generation module 52, and a communications module 54. The system code 44 could be programmed using any suitable programming language including, but not limited to, C, C++, C#, Java, Python, or any other suitable language. Additionally, the system code 44 could be distributed across multiple computer systems in communication with each other over a communications network, and/or stored and executed on a cloud computing platform and remotely accessed by a computer system in communication with the cloud platform. The system code 44 could communicate with the one or more databases 40 and the external data sources 42, which could be located within the same computer system as the system code 44, or on one or more other computer systems in communication with the system code 44.

Still further, the EPU 16 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 2 is only one potential configuration, and the system 10 of the present disclosure can be implemented using a number of different configurations.

Figure 3:
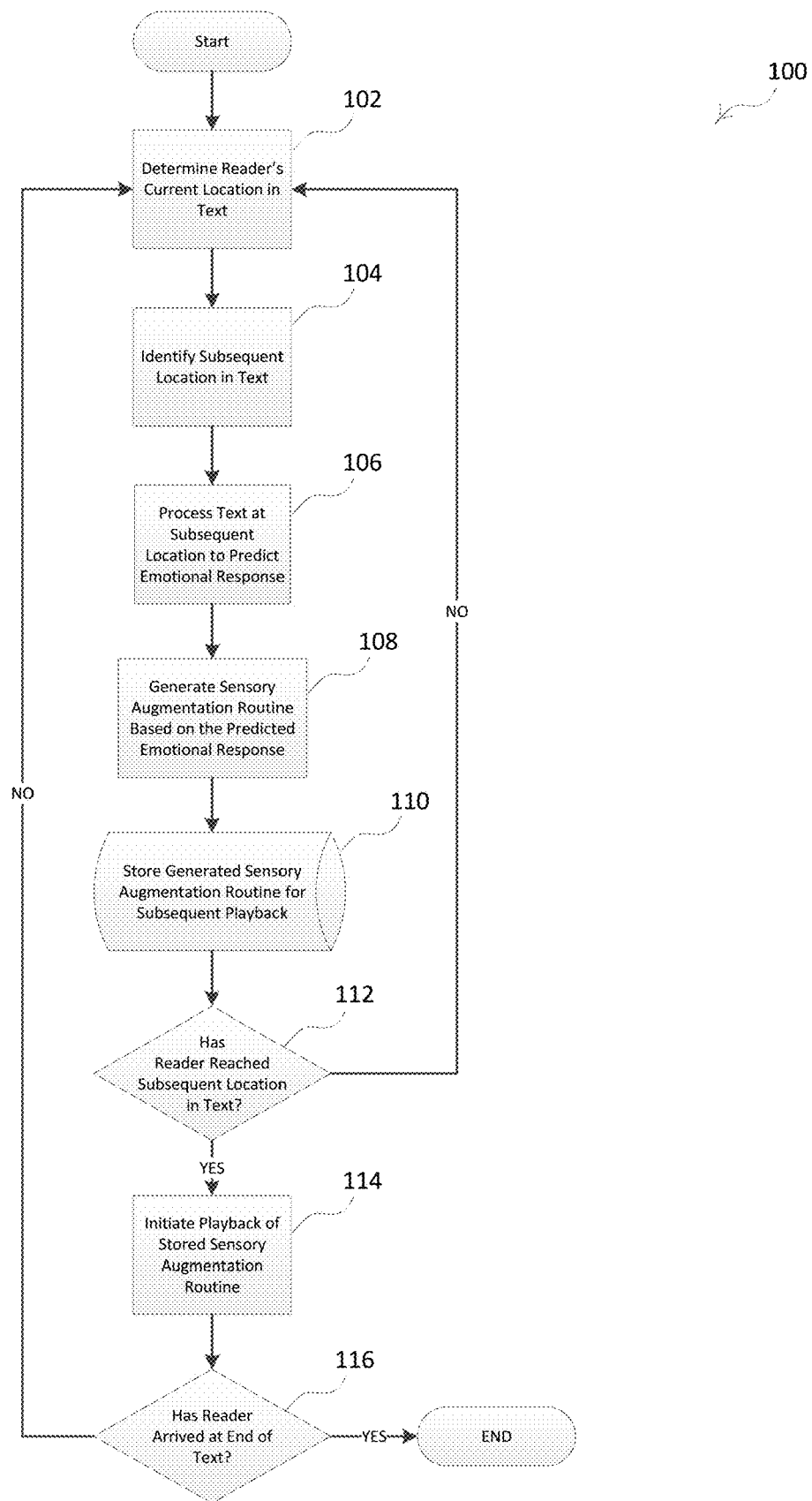
FIG. 3 is a flow diagram illustrating overall process steps carried out by the system of the present disclosure for generating a sensory augmentation routine based on a reader's predicted emotional response.

FIG. 3 is a flowchart illustrating the overall process steps 100 carried out by the system 10 of the present disclosure for generating sensory augmentation based on a reader's predicted emotional response to a given portion of text. In step 102, the system 10 determines the reader's current location in the text. As should be apparent to those of skill in the art, the system 10 can receive information from the display device 12 related to the text currently displayed on the display device, can receive information from the image capture device 14 related to the reader's eye movements and positions (e.g., gaze tracking), and can then determine the portion of the text currently being read. In step 104, the system 10 identifies a subsequent location in the text (e.g., based on a current reading rate of X words per minute). In step 106, the system 10 processes the text at the subsequent location (e.g., using optical character recognition, or the like, if necessary) and predicts an emotional response that the reader will have in response to reading the text at the subsequent location. For example, the EPU 16 can utilize artificial intelligence ("AI") and/or machine learning algorithms to predict an emotional response based on a given word, sentence, or passage. As such, the system 10 can anticipate the feelings that a reader will have in advance of reaching the subsequent location. In step 108, the system 10 generates a sensory augmentation routine based on the predicted emotional response. The sensory augmentation routine can include, for example, music or lighting selected to match the predicted emotional response. For example, if the system 10 predicts that a given passage will induce a feeling of happiness, the system can generate a sensory augmentation routine that includes ambient music that is upbeat and seamlessly adjusts to amplify the feeling of happiness. According to another example, if a main character of a story is in peril, the system 10 can generate a sensory augmentation routine having an atmosphere of low, sustained musical tension that can automatically rise to highlight a thrilling passage. According to another example, the system 10 can generate a sensory augmentation routine that includes an ambient lighting scene that matches the predicted emotional response (e.g., bright warm white ambient light for feelings of happiness and dark red ambient light for feelings of tension). In step 110, the system 10 stores the generated sensory augmentation routine (e.g., to database 40) for subsequent retrieval and playback. In step 112, the system 10 determines if the reader has reached the subsequent location in the text.

If a positive determination is made in step 112, the process proceeds to step 114, where the system 10 initiates playback of the stored sensory augmentation routine. For example, the system 10 can initiate playback of a sensory augmentation routine including ambient music or sounds on the audio output device 20, or can negotiate with a $3^{rd}$ party streaming music service (e.g., Spotify, Apple Music, etc.) to begin playback. In another example, the system 10 can initiate playback of a sensory augmentation routine including ambient lighting effects by instructing a $3^{rd}$ party smart lighting system (e.g., Philips Hue) to initiate a lighting scene with the ambient lighting effects. If a negative determination is made in step 112, the process returns to step 102, where the process steps are repeated until the system 10 determines that the reader has reached the subsequent location in the text. In step 116, the system 10 determines if the reader has arrived at the end of the text (e.g., using gaze tracking). If a negative determination is made in step 116, the process returns to step 102 and the process steps are repeated. If a positive determination is made in step 116, the process ends.

Figure 4:
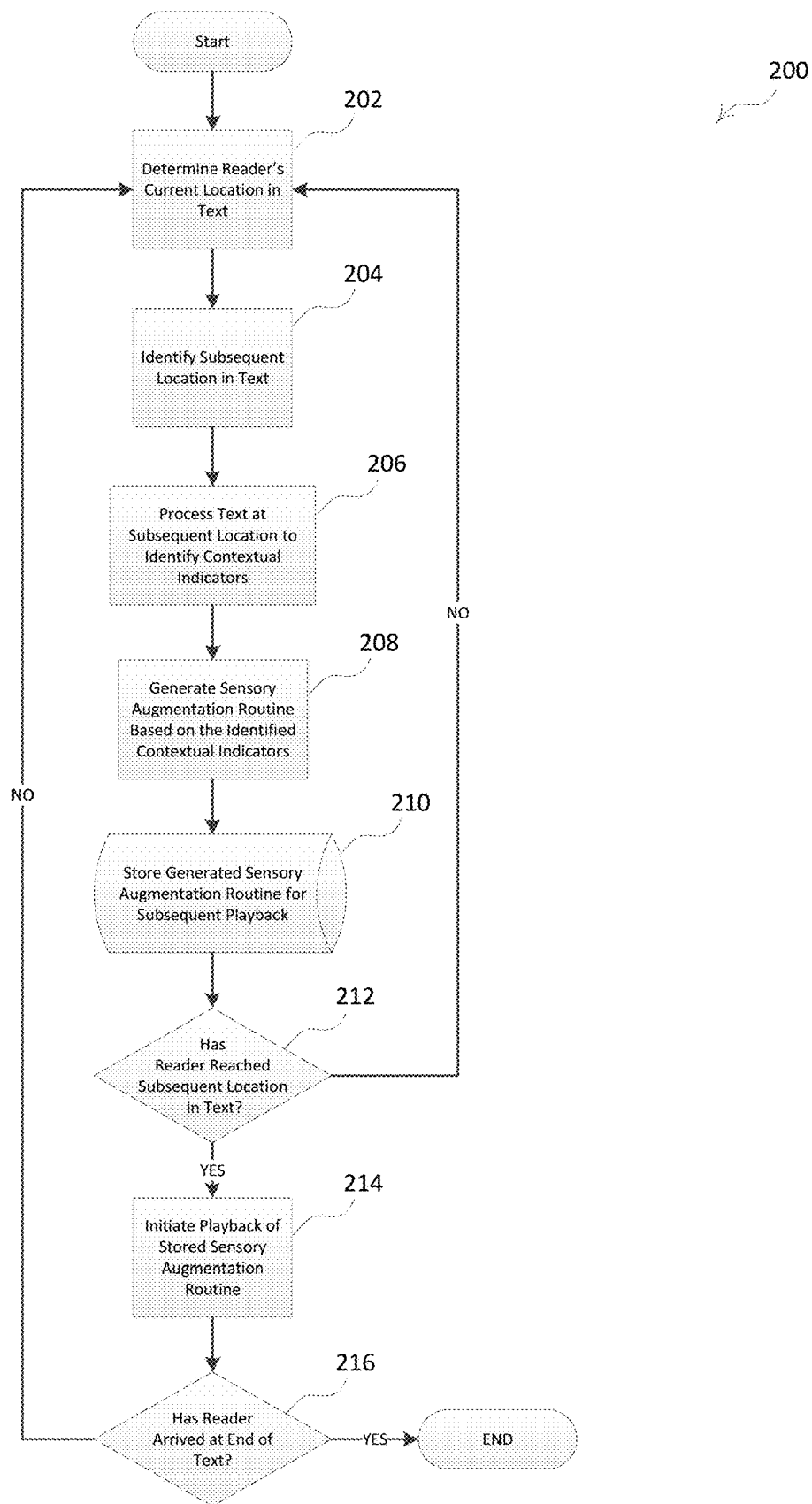
FIG. 4 is a flow diagram illustrating overall process steps carried out by the system of the present disclosure for generating a sensory augmentation routine based on contextual indicators identified in a given text.

FIG. 4 is a flowchart illustrating the overall process steps 200 carried out by the system 10 of the present disclosure for generating a sensory augmentation routine based on contextual indicators identified in a given portion of text. It should be understood that process steps 100 and 200 are not mutually exclusive and can be executed by the system 10 concurrently. In step 202, the system 10 determines the reader's current location in the text. As discussed above, the system 10 can receive information from the display device 12 related to the text currently displayed on the display device, can receive information from the image capture device 14 related to the reader's eye movements and positions (e.g., gaze tracking), and can then determine the portion of the text currently being read. In step 204, the system 10 identifies a subsequent location in the text (e.g., based on a current reading rate of X words per minute). In step 206, the system 10 processes the text at the subsequent location (e.g., using optical character recognition, or the like, if necessary) and identifies one or more contextual indicators at a subsequent location. As such, the EPU 16 can utilize artificial intelligence ("AI") and/or machine learning algorithms to identify a given word, sentence, or passage that conveys a particular sound, ambience, or context. For example, the system 10 could identify contextual indicators, such as, but not limited to a "crash," "thunder and lightning," a description of a sunset, and the like. According to another example, the system 10 could identify a particular composition of music that is being played within the context of a story. In step 208, the system 10 generates a sensory augmentation routine based on the identified contextual indicators. The sensory augmentation routine can include, for example, music or lighting selected to match the identified contextual indicators. For example, if the system 10 identifies the phrase "car crash," the sensory augmentation routine can include an audio recording of a car crash. Likewise, if the system 10 identifies the phrases "raining," or "thundering," the sensory augmentation routine can include an audio recording of a rainstorm or thunderstorm, respectively. Furthermore, if the system 10 identifies the phrases "raining," or "thundering," the sensory augmentation routine can include darkened ambient lighting effects and/or brief flashes of bright white lighting to convey darkened skies and/or lightening, respectively. According to another example, if the system 10 identifies a passage that describes a sunset, the system 10 can generate a sensory augmentation routine that includes ambient lighting effects (e.g., colors) based on the description of the sunset. In yet another example, if the system 10 identifies a passage where a particular composition of music is being played, the sensory augmentation routine can include the same composition of music.

In step 210, the system 10 stores the generated sensory augmentation routine (e.g., to database 40) for subsequent retrieval and playback. In step 212, the system 10 determines if the reader has reached the subsequent location in the text. If a positive determination is made in step 212, the process proceeds to step 214, where the system 10 initiates playback of the stored sensory augmentation routine. For example, the system 10 can initiate playback of a sensory augmentation routine including ambient sounds or music on the audio output device 20, or can negotiate with a $3^{rd}$ party streaming music service (e.g., Spotify, Apple Music, etc.) to begin playback. In another example, the system 10 can initiate playback of a sensory augmentation routine including ambient lighting effects by instructing a $3^{rd}$ party smart lighting system (e.g., Philips Hue) to initiate a lighting scene with the ambient lighting effects. If a negative determination is made in step 212, the process returns to step 202, where the process steps are repeated until the system 10 determines that the reader has reached the subsequent location in the text. In step 216, the system 10 determines if the reader has arrived at the end of the text (e.g., using gaze tracking). If a negative determination is made in step 216, the process returns to step 202 and the process steps are repeated. If a positive determination is made in step 216, the process ends.

Figure 5:
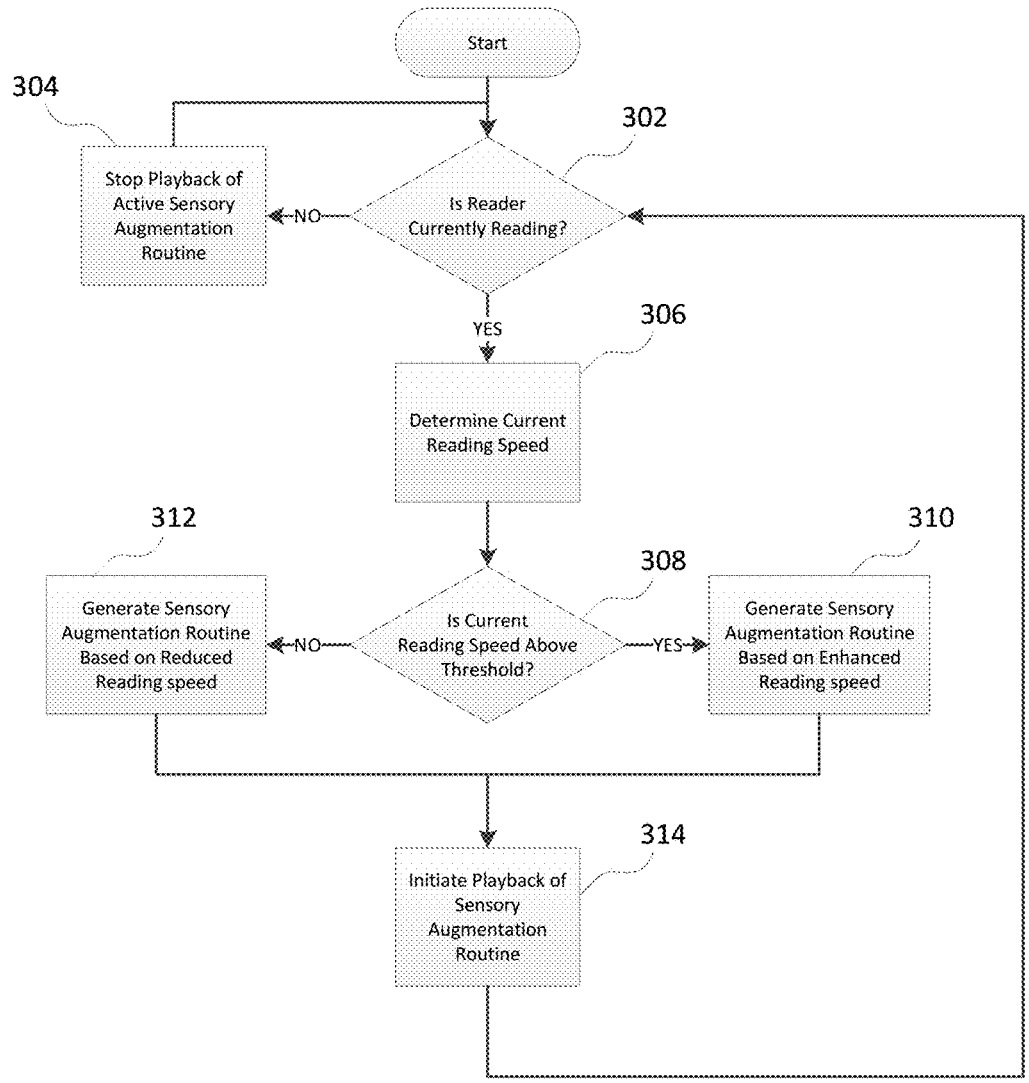
FIG. 5 is a flow diagram illustrating the overall process steps carried out by the system of the present disclosure for generating a sensory augmentation routine based on reading speed.

FIG. 5 is a flowchart illustrating the overall process steps 300 carried out by the system 10 of the present disclosure for generating a sensory augmentation routine based on the reading speed, or "flow," of a reader. It should be understood that process steps 300 are not mutually exclusive with process steps 100 and 200 and can be executed by the system 10 concurrently therewith. In step 302, the system 10 determines if the reader is currently reading, e.g., via gaze tracking systems, as described herein. If a negative determination is made in step 302, the process proceeds to step 304, where the system 10 stops playback of any active sensory augmentation routines and the process then returns to step 302. As such, the system 10 is continuously monitoring the reader to determine if the text is actively being read. If a positive determination is made in step 302, the process proceeds to step 306, where the system 10 determines the current reading speed of the reader. As should be apparent to those of skill in the art, the system 10 can receive information from the display device 12 related to the text currently displayed on the display device, can receive information from the image capture device 14 related to the reader's eye movements and positions (e.g., gaze tracking), and can then determine the reader's current reading speed. In step 308, the system 10 determines if the current reading speed is above a predetermined threshold (e.g., 250 words per minute). According to some embodiments, the system 10 can continuously adjust the predetermined threshold as the reader's speed and comprehension increases. For example, if the reader's speed is determined to be above the threshold (e.g., 250 words per minute), the system 10 can increase the reading speed threshold (e.g., to 255 words per minute) in a future reading session. Conversely, if the reader's speed is determined to be below the threshold (e.g., 250 words per minute), the system 10 can decrease the reading speed threshold (e.g., to 245 words per minute) in a future reading session. If a positive determination is made in step 308, the process proceeds to step 310, where the system 10 generates a sensory augmentation routine based on an enhanced reading speed. For example, the system 10 can generate a sensory augmentation routine in accordance with the process 100, described in connection with FIG. 3, and can increase the tempo, or beats per minute, thereof. If a negative determination is made in step 308, the process proceeds to step 312, where the system 10 generates a sensory augmentation routine based on a reduced reading speed. For example, the system 10 can generate a sensory augmentation routine in accordance with the process 100, and can decrease the tempo, or beats per minute, thereof. The process then proceeds to step 314, where the system 10 initiates playback of the sensory augmentation routine. For example, the system 10 can initiate playback of a sensory augmentation routine including ambient sounds or music on the audio output device 20, or can negotiate with a $3^{rd}$ party streaming music service (e.g., Spotify, Apple Music, etc.) to begin playback. In another example, the system 10 can initiate playback of a sensory augmentation routine including ambient lighting effects by instructing a $3^{rd}$ party smart lighting system (e.g., Philips Hue) to initiate a lighting scene with the ambient lighting effects.

Accordingly, the system 10 of the present disclosure can adjust the speed of the music, sound, lighting, or other sensory augmentation routine component to create a flow depending on the speed of reading. The system 10 can also detect how fluently a reader reads, and can generate sensory augmentation routines that initiate playback of certain musical compositions (e.g., upbeat or high-tempo tracks) only when a particular reading speed level is achieved. As such, the system of the present disclosure can create a resonance between the emotion in the text, the flow or speed of a reader, and sound, lighting, or other sensory augmentation components. Furthermore, sensory augmentation routines including music, sound, lighting effects, and the like create harmonies that link the cognition of the text and the emotional flow of the reader. This enables a reader to master his or her reading fluency rate, encourages the reader to reach a flow state, and enhances reading comprehension. Additionally, flow has been shown to lead to improved performance. For example, researchers have found that flow can enhance performance in a wide variety of areas, including, but not limited to, teaching, learning, athletics, and artistic creativity. Flow can also lead to advanced learning and skill development. Because achieving flow indicates proficiency with a certain skill (e.g., reading speed and comprehension), the reader must continually seek new challenges and information in order to maintain this state, which the system of the present disclosure can provide by continuously encouraging the reader to improve their reading speed and comprehension (e.g., by allowing access to particular music, sounds, and lighting effects only when higher levels of reading speed and comprehension are achieved).

It is noted that the systems/methods disclosed herein can also be utilized to generate other sensory augmentation routines/outputs. For example, the system could be configured to provide a neural link to a person's brain, and based on the person's predicted emotional state, conduct deep brain stimulation using the neural link. In such circumstances, instead of playing music in response to the person's predicted emotional state (e.g., from reading text), the system can induce a particular mood or sensory effect in the person using deep brain stimulation. Further, the system could be extended for use with augmented reality (AR), such that the system generates an AR scene or environment for a person in response to the person's predicted emotional state. Still further, the system can be applied to other types of inputs (beyond text), such as movies, music, images, sounds, sensor inputs, and other inputs. Additionally, the system could track where a user is looking within an image or a video, and based on the identified location within the image or the video, provide a sensory augmentation tailored to information obtained from the identified location. For example, if a user is looking at a knife, or a victim, or a killer in a video or image, a specific sensory augmentation (e.g., fear, dread, terror, and associated music and/or other sensory input) could be generated by the system.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A method for reading sensory augmentation comprising the steps of:
    displaying a text on a reading device;
    determining a current location of a reader in the text with a gaze tracking system;
    identifying a subsequent location in the text;
    processing the text at the subsequent location with an emotion processing unit to predict an emotional response to the text at the subsequent location;
    generating a sensory augmentation routine based on the predicted emotional response; and
    initiating playback of the sensory augmentation routine upon the reader reaching the subsequent location in the text;
    determining if the reader is currently reading;
    stopping the playback of the sensory augmentation routine if the reader is not currently reading; and
    determining a current reading speed of the reader if the reader is currently reading.

2. The method of claim 1, wherein the sensory augmentation routine comprises one or more of a musical composition, a sound, and an ambient lighting effect.

3. The method of claim 1, wherein the gaze tracking system receives data from the reading device related to the text currently displayed thereon and receives data from an image capture device related to eye movement tracking of the reader.

4. The method of claim 1, comprising the steps of:
processing the text at the subsequent location to identify one or more contextual indicators;
generating a second sensory augmentation routine based on the one or more contextual indicators; and
initiating playback of the second sensory augmentation routine upon the reader reaching the subsequent location in the text.

5. The method of claim 4, wherein the second sensory augmentation routine comprises one or more of a musical composition, a sound, and an ambient lighting effect.

6. The method of claim 1, comprising the steps of:
determining if the current reading speed of the reader is above a predetermined threshold;
generating a second sensory augmentation routine if the current reading speed is below the predetermined threshold; and
generating a third sensory augmentation routine if the current reading speed is above the predetermined threshold.

7. The method of claim 6, comprising the steps of:
reducing the predetermined threshold if the current reading speed is below the predetermined threshold;
increasing the predetermined threshold if the current reading speed is above the predetermined threshold; and
storing the reduced or increased predetermined threshold to a memory for subsequent retrieval.

8. The method of claim 1, wherein the sensory augmentation routine comprises an augmented reality scene or augmented reality environment.

9. The method of claim 8, wherein the sensory augmentation routine comprises one or more of a musical composition, a sound, and an ambient lighting effect.

10. A non-transitory computer-readable medium having stored thereon a plurality of computer-executable instructions which, when executed by one or more processors, cause the one or more processors to:
display a text on a reading device;
determine a current location of a reader in the text with a gaze tracking system;
identify a subsequent location in the text;
process the text at the subsequent location with an emotion processing unit to predict an emotional response to the text at the subsequent location;
generate a sensory augmentation routine based on the predicted emotional response; and
initiate playback of the sensory augmentation routine upon the reader reaching the subsequent location in the text;
determine if the reader is currently reading;
stop the playback of the sensory augmentation routine if the reader is not currently reading; and
determine a current reading speed of the reader if the reader is currently reading.

11. The non-transitory computer-readable medium of claim 10, wherein the sensory augmentation routine comprises one or more of a musical composition, a sound, and an ambient lighting effect.

12. The non-transitory computer-readable medium of claim 10, wherein the gaze tracking system receives data from the reading device related to the text currently displayed thereon and receives data from an image capture device related to eye movement tracking of the reader.

13. The non-transitory computer-readable medium of claim 10, wherein the plurality of computer-executable instructions, when executed by the one or more processors, cause the one or more processors to:
process the text at the subsequent location to identify one or more contextual indicators;
generate a second sensory augmentation routine based on the one or more contextual indicators; and
initiate playback of the second sensory augmentation routine upon the reader reaching the subsequent location in the text.

14. The non-transitory computer-readable medium of claim 13, wherein the second sensory augmentation routine comprises one or more of a musical composition, a sound, and an ambient lighting effect.

15. The non-transitory computer-readable medium of claim 10, wherein the plurality of computer-executable instructions, when executed by the one or more processors, cause the one or more processors to:
determine if the current reading speed of the reader is above a predetermined threshold;
generate a second sensory augmentation routine if the current reading speed is below the predetermined threshold; and
generate a third sensory augmentation routine if the current reading speed is above the predetermined threshold.

16. The non-transitory computer-readable medium of claim 15, wherein the plurality of computer-executable instructions, when executed by the one or more processors, cause the one or more processors to:
reduce the predetermined threshold if the current reading speed is below the predetermined threshold;
increase the predetermined threshold if the current reading speed is above the predetermined threshold; and
store the reduced or increased predetermined threshold to a memory for subsequent retrieval.

17. The non-transitory computer-readable medium of claim 10, wherein the sensory augmentation routine comprises an augmented reality scene or augmented reality environment.

18. The non-transitory computer-readable medium of claim 17, wherein the sensory augmentation routine comprises one or more of a musical composition, a sound, and an ambient lighting effect.

* * * * *